Figure 7A:
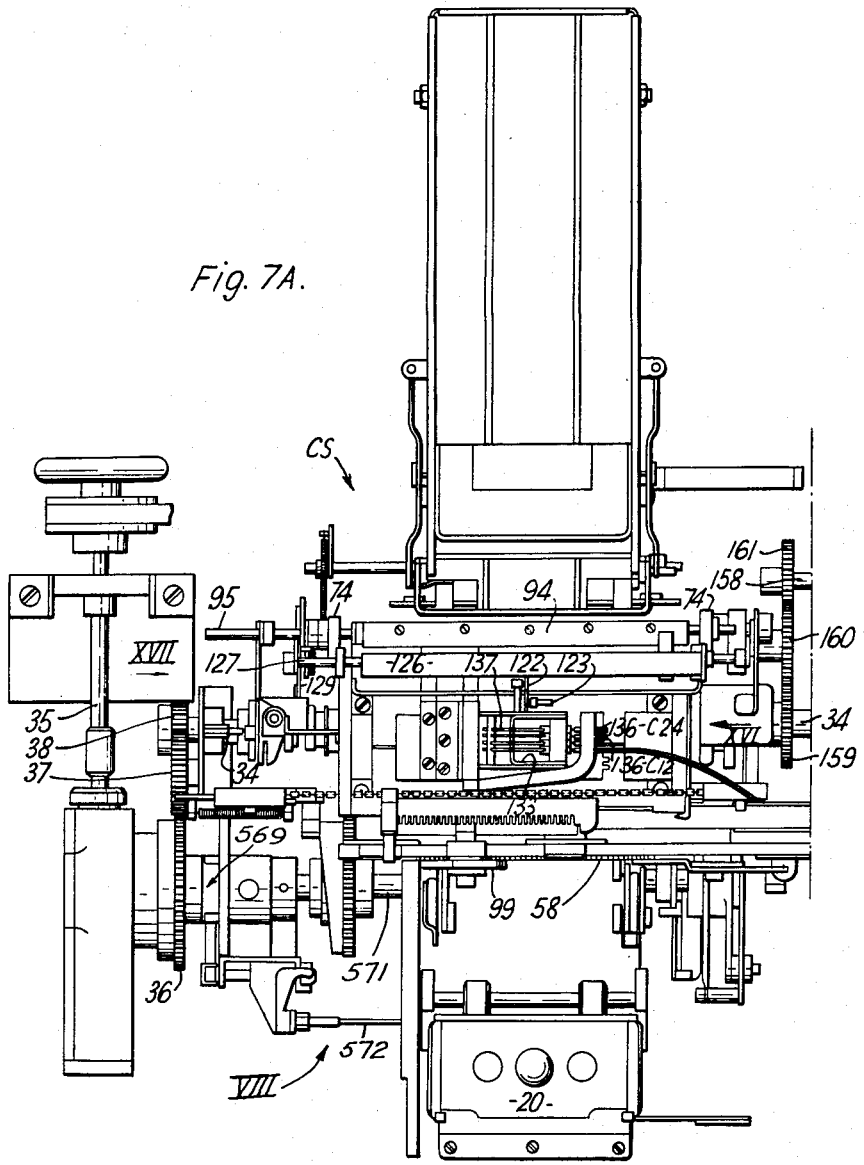

April 24, 1956  A. THOMAS ET AL  2,742,966
MACHINES CONTROLLED BY STATISTICAL RECORD CARDS
Filed May 11, 1953  15 Sheets-Sheet 1
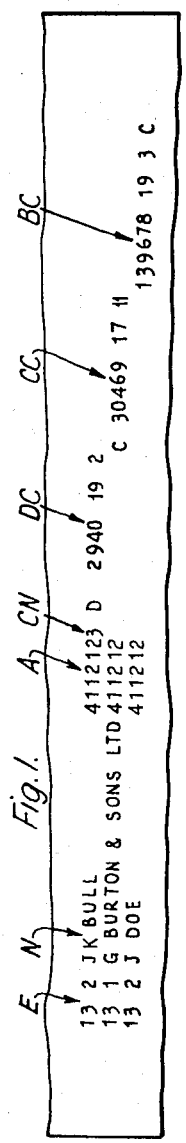
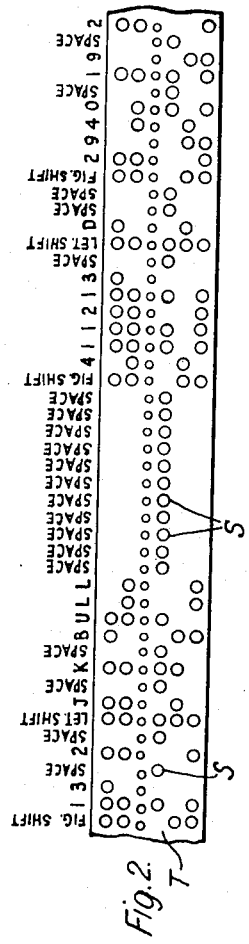
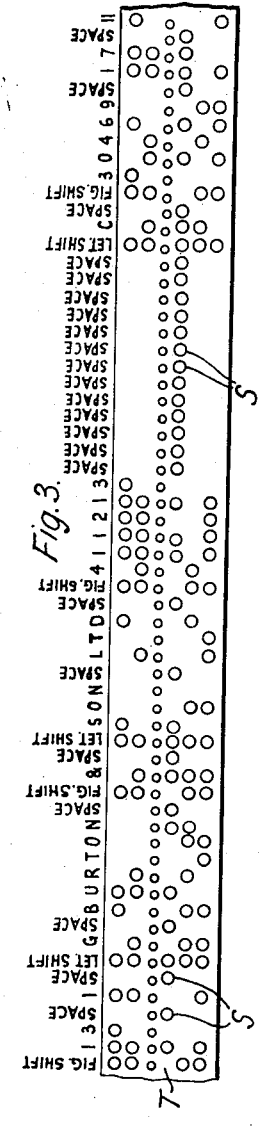
Inventors
ARTHUR THOMAS
FREDERICK S. RHODES
By
Attorney April 24, 1956 A. THOMAS ET AL 2,742,966
MACHINES CONTROLLED BY STATISTICAL RECORD CARDS
Filed May 11, 1953 15 Sheets-Sheet 2

Inventors
ARTHUR THOMAS
FREDERICK S. RHODES
By
Attorney

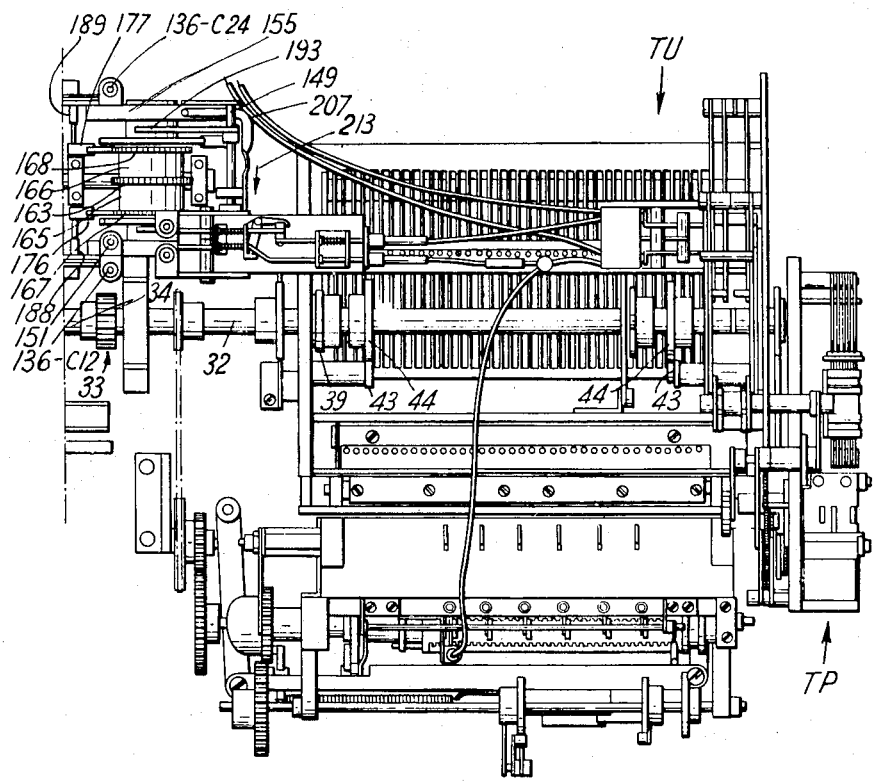

Inventors
ARTHUR THOMAS
FREDERICK S. RHODES
By
Attorney

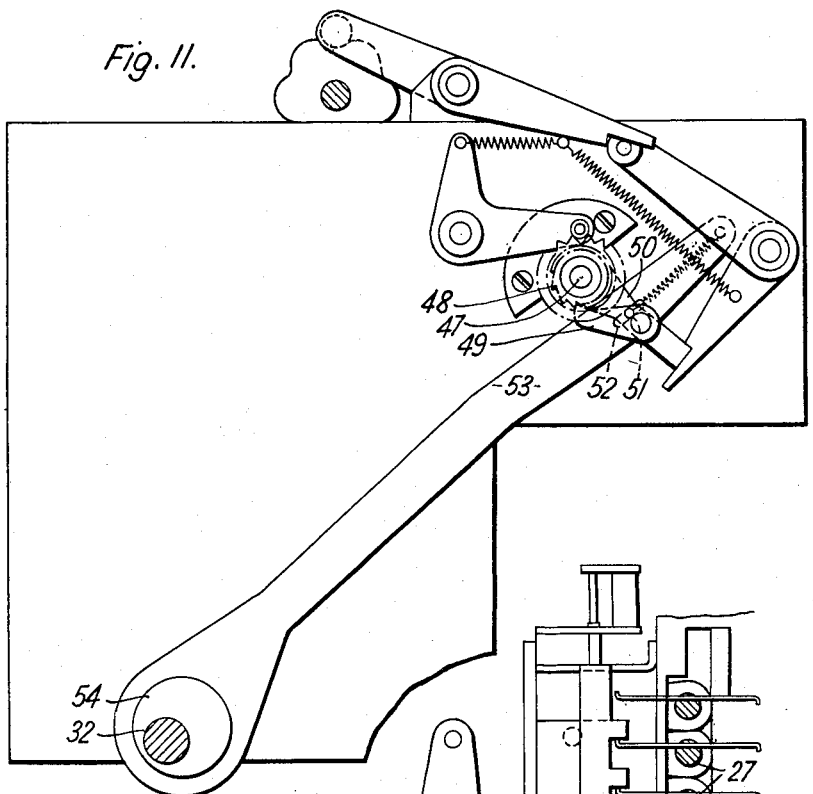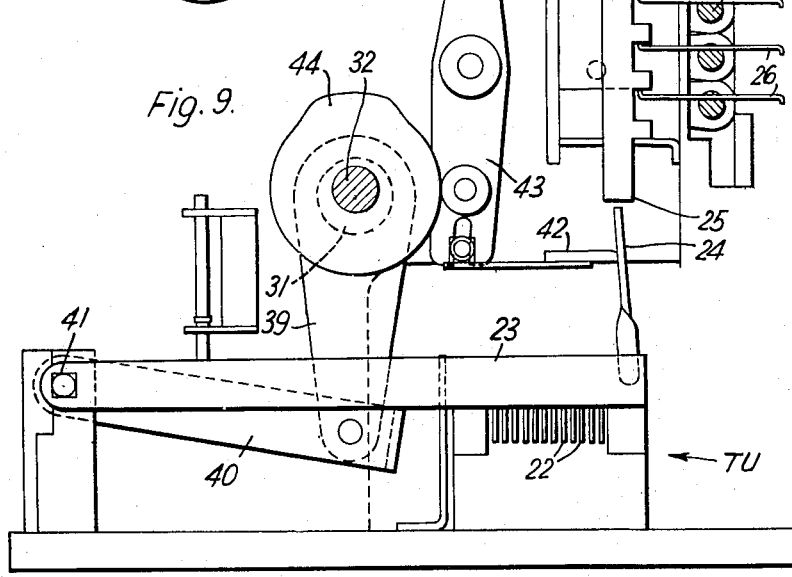

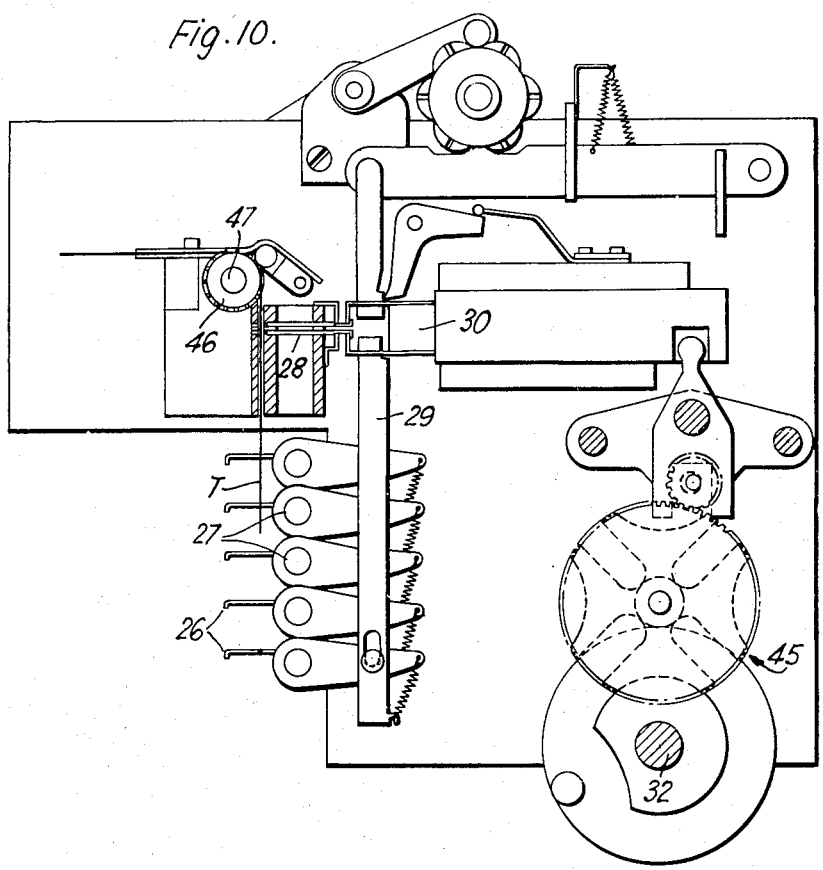

Inventors
ARTHUR THOMAS
FREDERICK S. RHODES

April 24, 1956  A. THOMAS ET AL  2,742,966
MACHINES CONTROLLED BY STATISTICAL RECORD CARDS
Filed May 11, 1953  15 Sheets-Sheet 9

Inventors
ARTHUR THOMAS
FREDERICK S. RHODES
By
Attorney

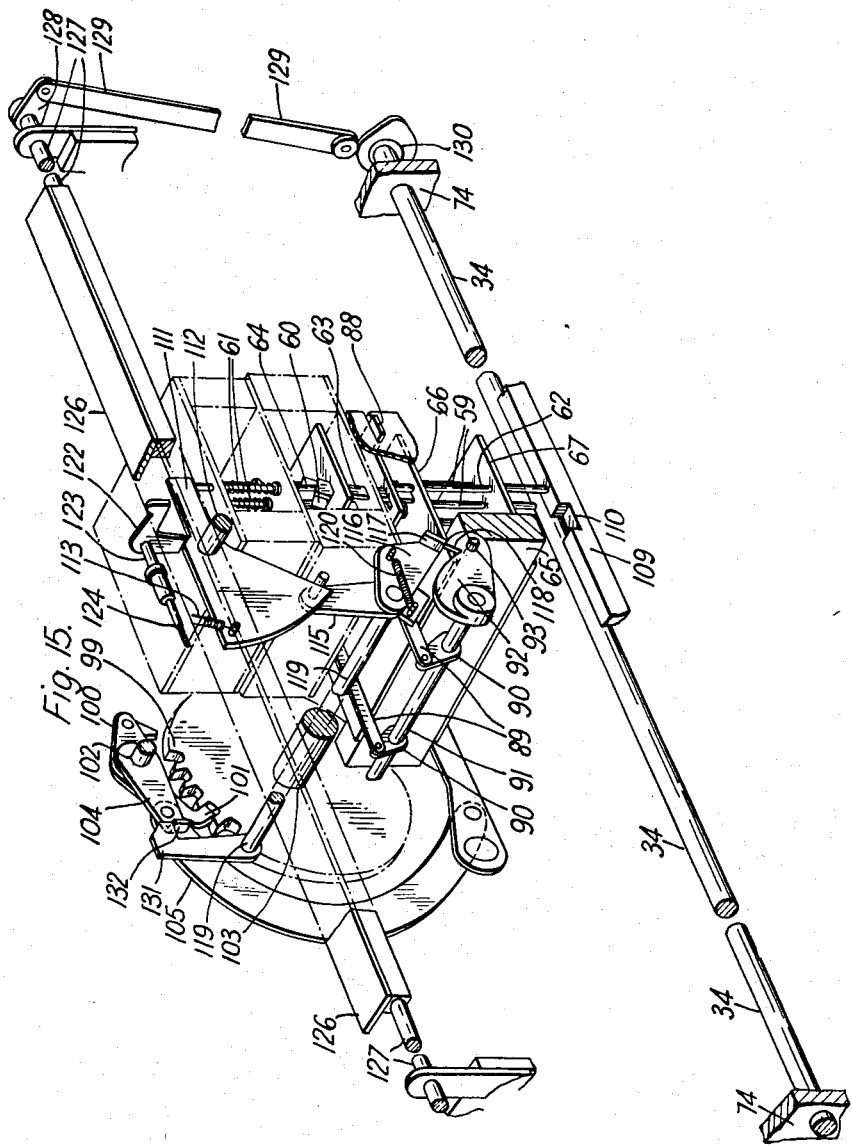

April 24, 1956     A. THOMAS ET AL     2,742,966
MACHINES CONTROLLED BY STATISTICAL RECORD CARDS
Filed May 11, 1953     15 Sheets-Sheet 11

Inventors
ARTHUR THOMAS
FREDERICK S. RHODES
By
Attorney

Inventors
ARTHUR THOMAS
FREDERICK S. RHODES
By
Attorney

April 24, 1956  A. THOMAS ET AL  2,742,966
MACHINES CONTROLLED BY STATISTICAL RECORD CARDS
Filed May 11, 1953  15 Sheets-Sheet 15

Inventors
ARTHUR THOMAS
FREDERICK S. RHODES
By
Attorney

United States Patent Office 2,742,966
Patented Apr. 24, 1956

2,742,966
MACHINES CONTROLLED BY STATISTICAL RECORD CARDS

Arthur Thomas, Wallington, and Frederick Sidney Rhodes, Thornton Heath, England, assignors to Powers-Samas Accounting Machines Limited, London, England, a British company Application May 11, 1953, Serial No. 354,100

Claims priority, application Great Britain August 14, 1952

13 Claims. (Cl. 164—114)

This invention relates to machines controlled by statistical record cards and in particular to a machine in which data recorded in a statistical record card is sensed during stepwise movement between the card and a testing device, the data being transmitted to a translator means by which it is translated into coded form and transmitted to a recording unit, for example a punch unit, which is conditioned by the translator means and by which the coded data is recorded on a tape fed continuously step by step, one step for each testing cycle.

In machines of this kind as proposed heretofore, it has been proposed, whenever no data or other signal is to be recorded on the tape, automatically to record thereon a space signal but in these prior proposals such automatic space signals are initiated by a blank column on the statistical record card and this has reduced the data-bearing capacity of the card.

It is one object of the present invention to provide a machine of the kind set out above in which space signals are automatically recorded on a tape without the use of blank card columns whereby the data-bearing capacity for any given card is greater than that of a comparable card as used heretofore for the same purpose.

It is a further object of the present invention to provide a machine of the kind set out above in which under the control of indications formed in a single predetermined card column the operation of the means for automatically providing said space signals may be varied so as automatically to provide on the tape a predetermined number of successive space signals whereby when the tape is transcribed, for example by a teleprinter the transcribed data may be printed in a tabulated form as, for example, a bank balance statement showing debit, credit and balance amounts in appropriate tabulated columns.

According to the present invention a machine comprises the combination with set-up members controlled by a record card and arranged in columns corresponding to the columns of the record card to receive a set-up representative of data sensed from the card, a testing device arranged to test said set-up members column by column, translator means operable under control of the testing elements to receive from the set-up members data sensed from a card and to translate it into coded form, recording means operable under control of the translator means to record the coded data on a tape, continuously operable tape-feeding means to feed the tape stepwise one step for each testing cycle of the machine, and space signal means operable under control of the translator means to condition the recording means to record a space signal on the tape whenever no data or other signal is to be recorded thereon resultant from a testing cycle of the machine, of interrupter means to render the testing device ineffective for at least one testing cycle during which a space signal is recorded on the tape, control means co-operating with said interrupter means and arranged on testing for data from predetermined columns of set-up members to initiate operation of said interrupter means, and trip means co-operating with the interrupter means to render the interrupter means ineffective for at least one testing cycle after initiation of operation thereof.

It will be understood that data may be recorded on the statistical record cards and on the tape by perforations formed therein or by suitable marks formed thereon but in the preferred embodiment of the invention herein described, by way of example, with reference to the accompanying diagrammatic drawings the data is recorded, both on the record cards and on the tape, by perforations.

Figure 8:
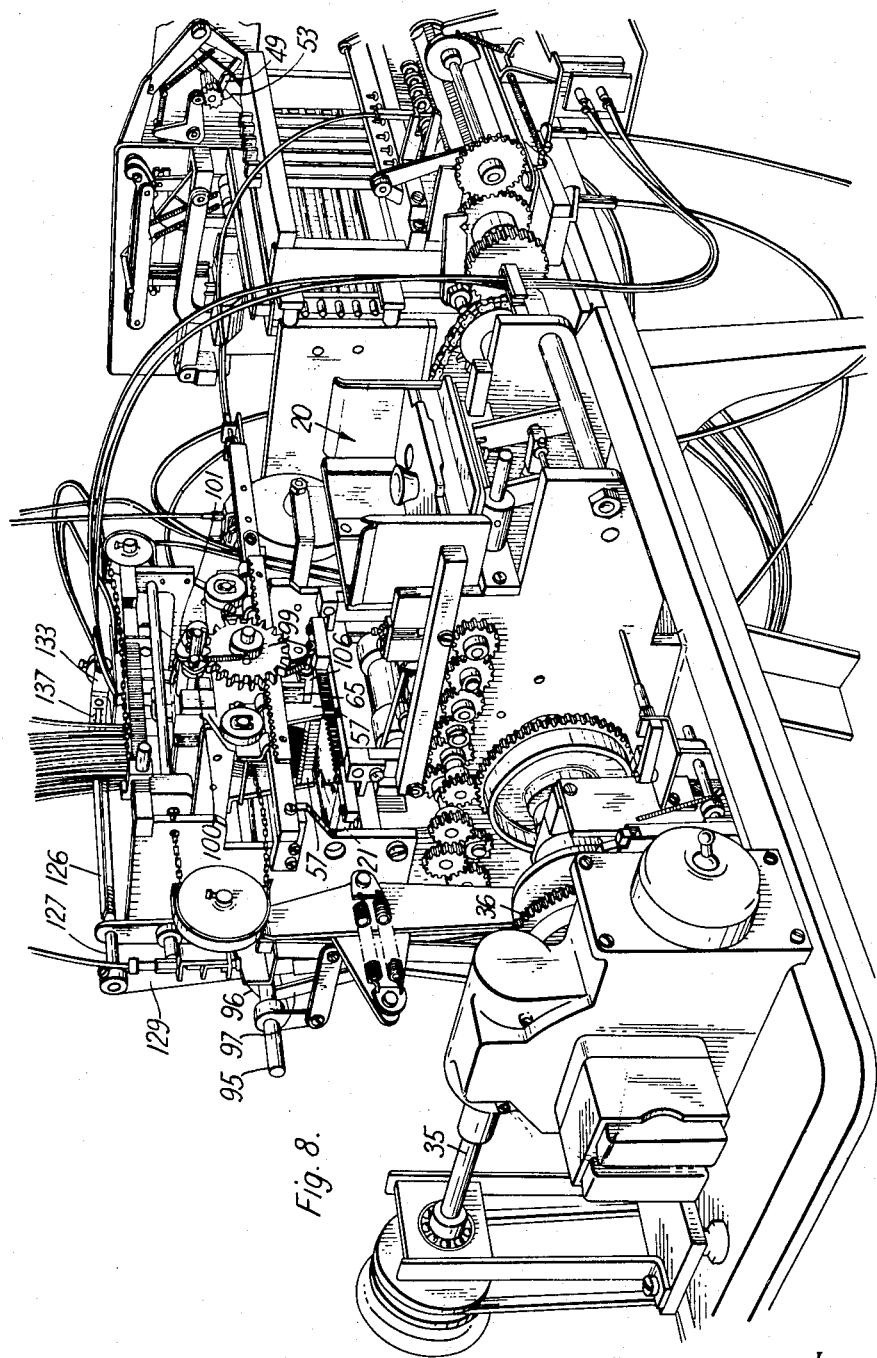
Figure 12:
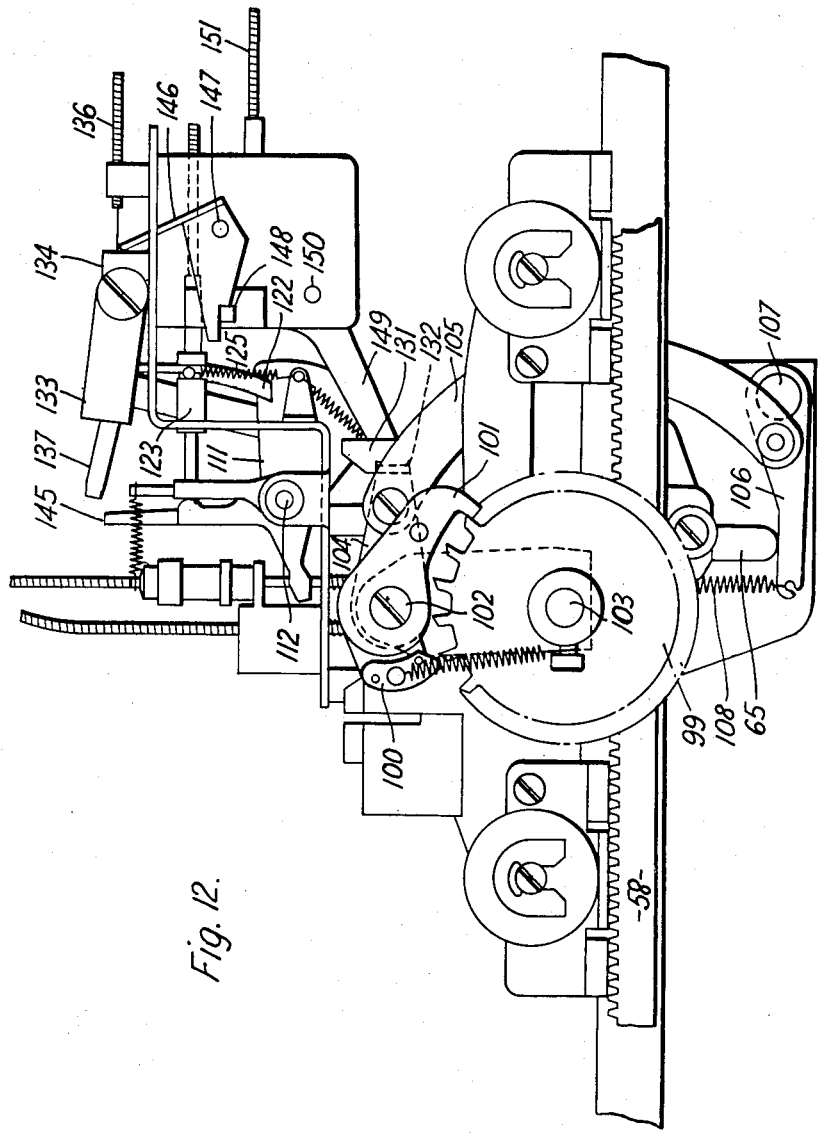
Figures 13, 14:
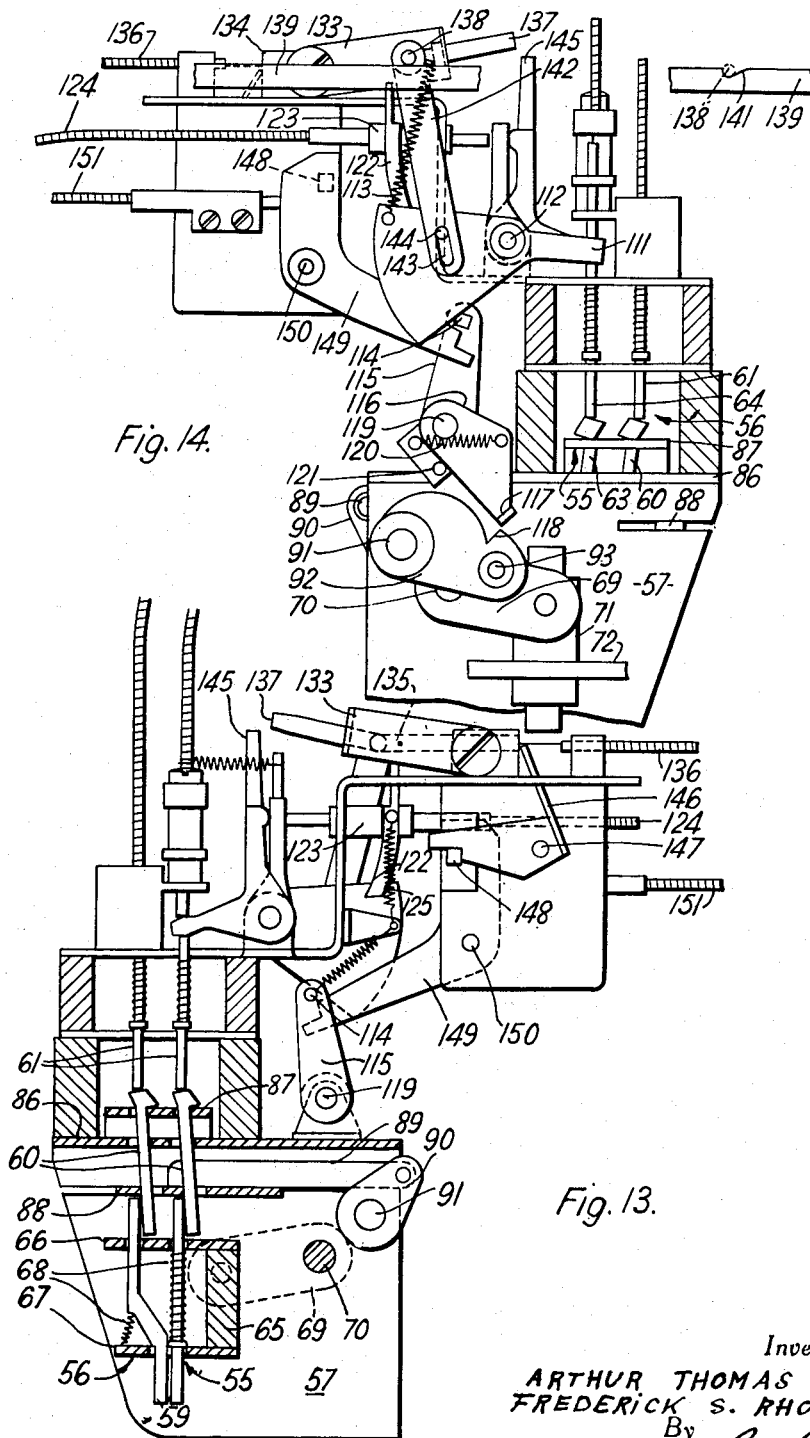
Figure 16:
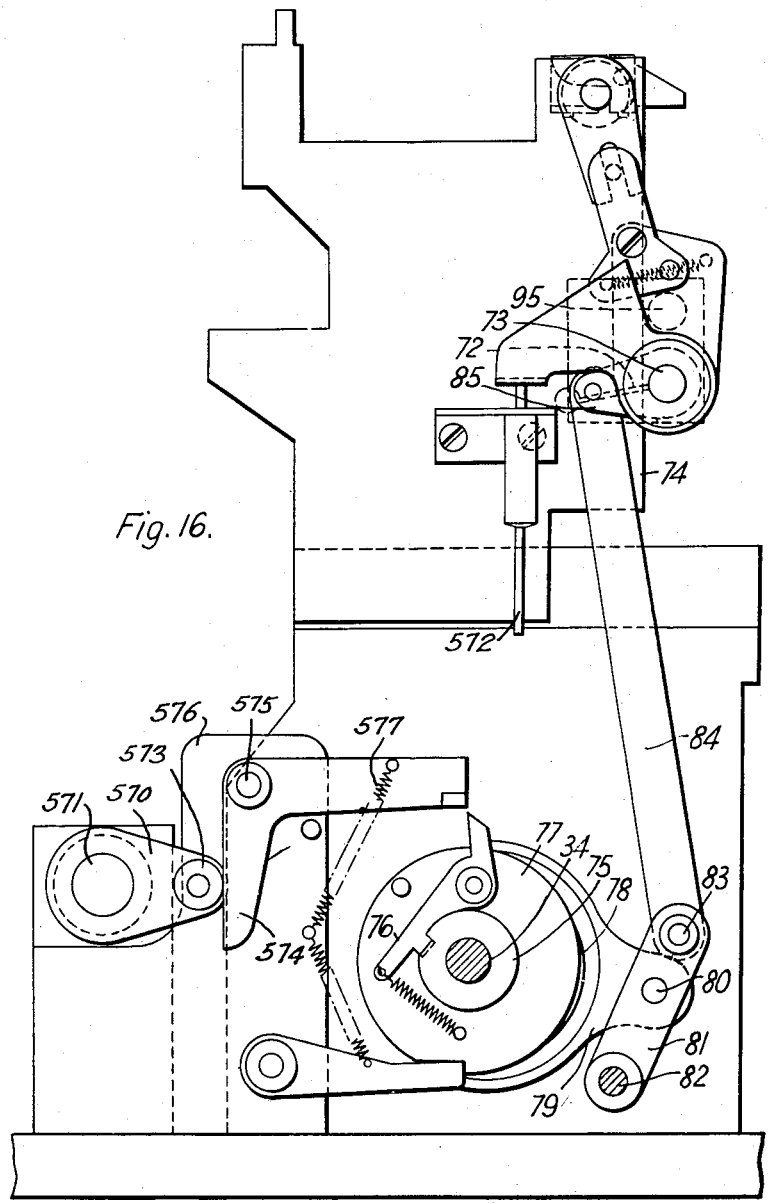
Figure 17:
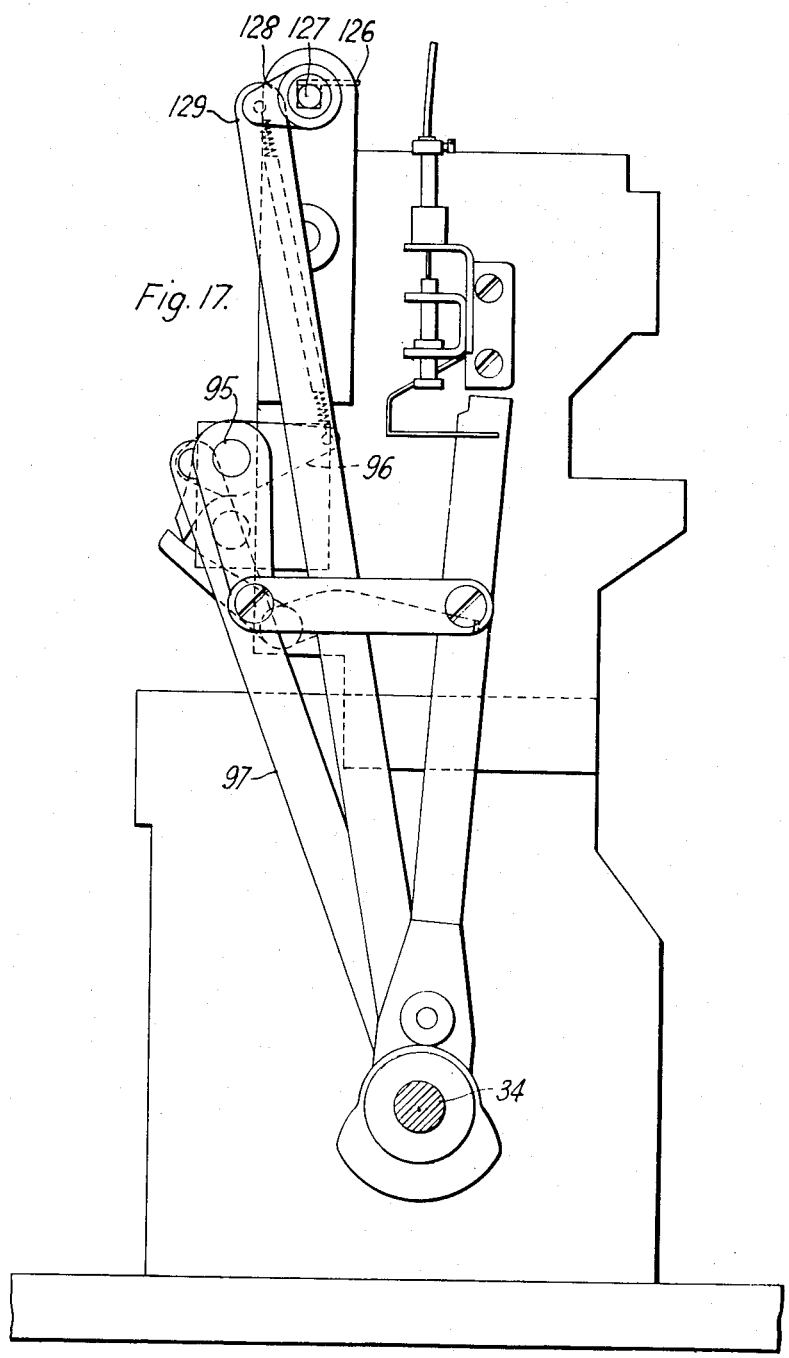
Figure 18:
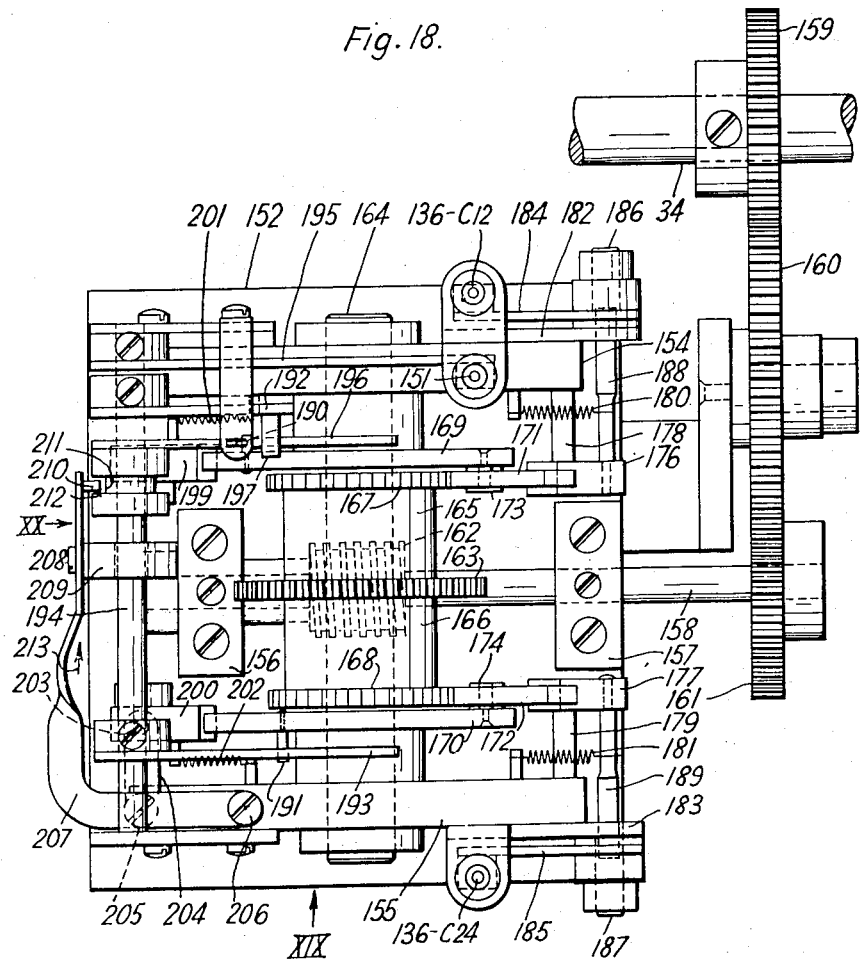
Figure 19:
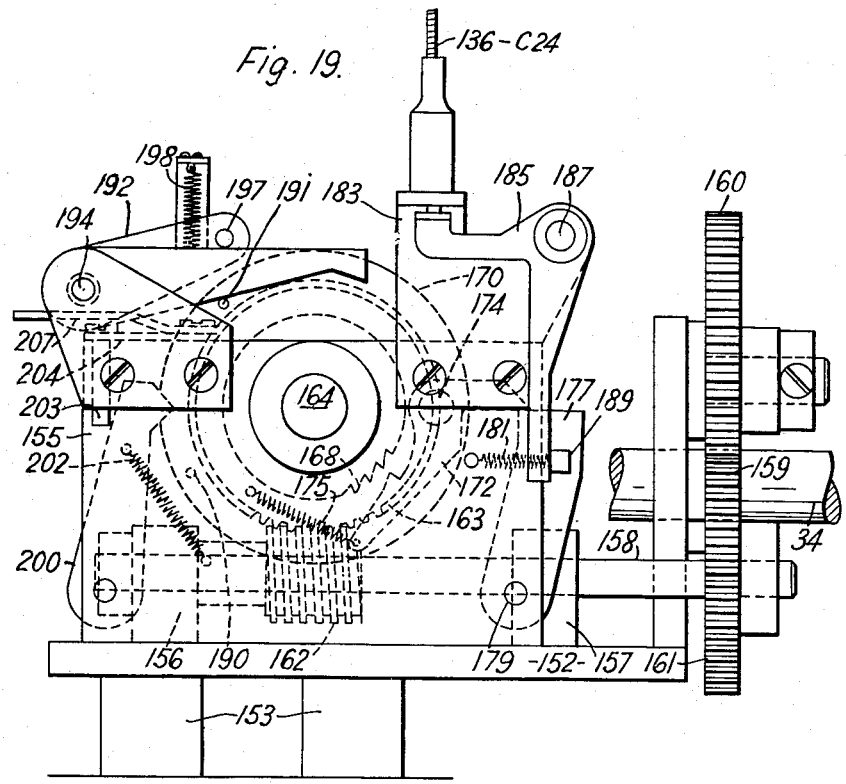
Figure 21:
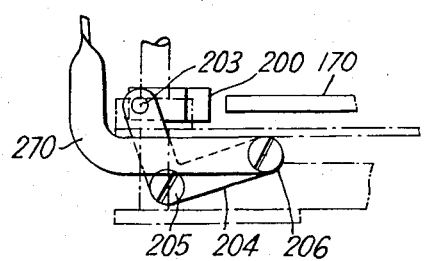
Figure 20:
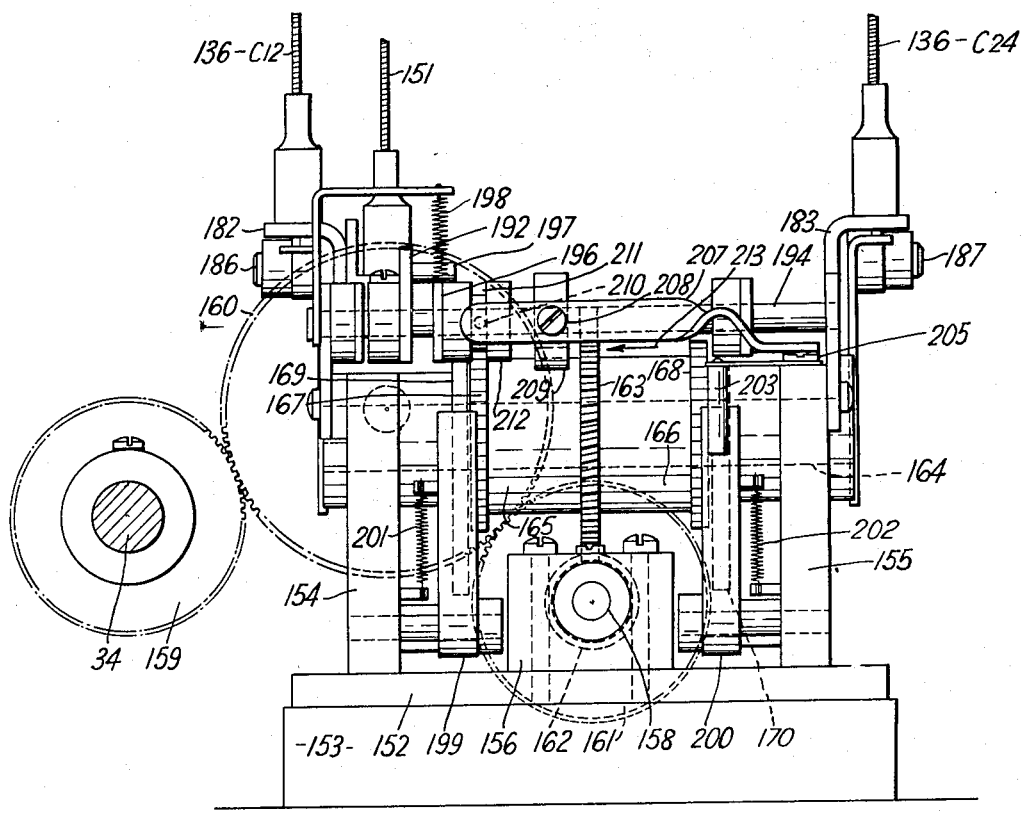

In the drawings:

Fig. 1 illustrates a portion of a bank statement transcribed from a perforated tape, Figs. 2 and 3 illustrate portions of perforated tape from which the first two lines on the statement have been transcribed, Figs. 4, 5 and 6 illustrate perforated record cards from which a tape is punched to provide the three lines of transcription shown in Fig. 1, Figs. 7A and 7B together illustrate a plan of the machine for perforating a tape in accordance with data sensed from statistical record cards, Fig. 8 is a pictorial view of the machine as viewed in the general direction of arrow VIII, Fig. 7A, Fig. 9 diagrammatically illustrates part of the apparatus for translating data from a two-hole to a five-hole code, Fig. 10 is a side elevation of the tape punching mechanism, Fig. 11 illustrates mechanism for feeding the tape through the tape punching mechanism, Fig. 12 is an end elevation of the testing device for the set-up mechanism of the machine, Fig. 13 is a section through the testing device, Fig. 14 is an elevation, partly in section, of the end of the testing device opposite that shown in Fig. 12, Fig. 15 is a pictorial illustration of some of the testing device, Fig. 16 is a view looking in the direction of arrow XVI, Fig. 7A and shows some of the driving mechanism, Fig. 17 is a view looking in the direction of arrow XVII, Fig. 7A, and shows some of the actuating mechanism for the testing device, Fig. 18 is a plan of the space unit employed in the machine, Fig. 19 is an elevation looking in the direction of arrow XIX, Fig. 18, Fig. 20 is an elevation looking in the direction of arrow XX, Fig. 18, and Fig. 21 is a detail showing some of the parts illustrated in Fig. 18 in positions different from those they occupy in Fig. 18.

Fig. 1 illustrates a bank statement which has been printed from a transcription of a perforated tape and it will be observed that, reading from left to right of the figure, each line of the statement consists of a date E, a name N, an account number A, and an amount which is tabulated to be either in a debit entry column DC, a credit entry column CC, or a balance column BC. In Fig. 1, the statement is presumed to be that of the account of J. Doe and it is to be understood that Fig. 1 shows only the foot of the statement and that the figures shown in the balance column BC represent the new balance. The first line at the head of the statement will, of course, also have an amount in the balance column, which amount will represent the old balance, and between the old and new balance amounts there may be any number of entries in the debit and credit entry columns respectively. With one exception, that of the letter C, or D if appropriate, following the entry in the balance column, all the data on the statement has been obtained from perforations formed in statistical record cards, such as are shown in Figs. 4, 5 and 6, and all has been transcribed from a perforated tape T portions of which, representative of the first two lines of printing shown on Fig. 1, are shown in Figs. 2 and 3. The means for perforating in the tape the letter C, or D, following the balance amount forms no part of the present invention and will not be described herein.

In the drawings, the record cards are shown as being forty-column cards, that is they contain forty vertical columns in which data can be recorded and it will be seen that on each card columns 1 to 4 are appropriated for a date, day and month, columns 5 to 23 are for the name of the account, columns 24 to 29 are for the account number, column 30 is for a code number which may be required to follow the account number as indicated at CN, Fig. 1, column 31 is a control column in which, as will be explained below, are punched control holes some of which will determine whether the amount is recorded in the tape for transcription in statement columns DC, CC, or BC, and columns 32 to 40 have the amount punched therein.

From Fig. 6 it will be seen that the sterling amount £139678 19 3 is recorded in the card as 139678193 and the present invention embodies means, to be described below, whereby the appropriate space signals for spacing the figures are automatically punched in the tape. Similarly, there is provide an automatic space signal to ensure that the last figure of the date is spaced from the first letter of the name on the statement although such figure and letter are punched in adjoining card columns, that is in columns 4 and 5 of the card. Where, however, variable spaces are required, such as between the initials and the surname, these spaces are, as has heretofore been proposed, automatically determined by the provision of blank card columns as indicated at NP Figs. 4, 5 and 6.

Figs. 7A and 7B together are a plan of a machine embodying the present invention, the machine comprising a card sensing unit CS, a translator unit TU, and a tape-punching unit TP all of which are driven by any suitable means such as an electric motor not shown.

Record cards are contained in a magazine 20, Figs. 7A and 8, from which they are fed one at a time, in known manner, to a vertically reciprocable card chamber, not shown which by means forming no part of the present invention raises the card in the chamber into co-operation with a set-up mechanism of known construction comprising columns of set-up members 21, Fig. 8, each column, as is customary, comprising a set-up member for each data-indicating position in a vertical column of a record card. Thus as each vertical column of a card has twelve data-indicating positions, see Figs. 4, 5 and 6, each column of set-up members comprises twelve set-up members.

The set-up members 21 of each column are displaceable vertically relative one to the other so that when a card is raised into co-operation therewith those set-up members which are aligned with data-indicating perforations in the card pass through the perforations and those not so aligned are displaced vertically. Accordingly, the set-up members which have not been vertically displaced represent the data recorded in the card by the perforations formed therein. The timing of the card chamber operating mechanism is such that the chamber retains a card in raised position while a testing device, described below, tests the set-up members column by column and the chamber is not lowered until the testing operation is completed.

The translator unit TU and tape-punching unit TP form no part of the present invention and there will be described below only such functions of these units as are necessary to the understanding of the invention.

Data which is sensed by the testing device is transmitted thereby as impulses which operate slotted code bars 22, Fig. 9, of known construction with which co-operate rocking bars 23 carrying members 24 to co-operate with toothed bars 25 which through plates 26 rock rods 27, Figs. 9 and 10, and so effect selection of a row of punches 28 by interpolating vertical bars 29 between the ends of the punches and a punch-operating member 30.

The rocking bars 23 are controlled by eccentrics 31 on a main shaft 32, Fig. 7B, which is conected by a 1:1 ratio gearing 33 with a main shaft 34 driven by continuously rotating driving shaft 35 through gearing 36, 37, 38. The eccentrics 31 carry straps 39 connected to a bail 40 rockable about the pivot 41 for the rocking bars 23 and during each revolution of the shaft 34, which represents one testing cycle, the bail permits any rocking bar 23 which, due to the operation of the code bars 22 by impulses received from the testing device, is disposed above aligned slots in the code bars to descend into the slots so that the member 24 carried by the rocking bar is disposed beneath a toothed bar 25 as illustrated in Fig. 9. When the bail 40 is next raised the member 24 moves lengthwise the toothed bar 25 with which it co-operates so that the appropriate bar or bars 29 is or are thereby caused to be interpolated between the end of a punch 28 and the punch-operating member 30. The arrangement of the translator unit is such that in the event of the testing device sensing no data in a column of set-up members 21, indicative of a blank column NP on the record card, one of the toothed bars 25 will be operated so that the tape T will receive a single perforation S, Fig. 2, representative of a space signal. The members 24 are restored to their inactive positions by a restoring element 42 common thereto and carried by swinging arms 43 operated by cams 44 on the shaft 32.

The punch-operating member 30 comprises a sliding block movement of which is effected by a Geneva driving mechanism indicated generally at 45, Fig. 10, and driven from the shaft 32.

The tape T is fed continuously step by step to the punches 28 by a pin wheel 46, Fig. 10, on a spindle 47 having secured thereto a ratchet wheel 48, Fig. 11, rotation of which is effected by a feed pawl 49 carried by a pawl-carrying arm 50 pivoted on the spindle 47. A pin 51 on arm 50 extends into a slot 52 in a link 53 which is continuously reciprocated by an eccentric 54 on the shaft 32 so that the pawl 49 rotates the ratchet wheel 48 one-tooth step at each revolution of the shaft 32.

Referring more particularly to Figs. 12 to 15, the testing device comprises a first column 55 of sensing elements and a second column 56 of sensing elements mounted one in advance of the other in a carriage which includes a pair of end frames 57, the carriage being movable step-wise along a rack 58, Fig. 12, under control of escapement mechanism described below.

Each column 55, 56 comprises for each data-indicating position in a vertical column of a card a testing pin 59, a member 60 referred to herein as a hatchet pin, and an actuator 61. In accordance with the present invention the first column 55 also includes an interrupter element consisting of a testing pin 62, hatchet pin 63, and an actuator 64, Figs. 14 and 15, the interrupter element forming part of interrupter means which, as described below, effect interruption of relative movement between the testing device and the card to render the testing device ineffective for at least one testing cycle thereby to permit the formation of the tape T of the automatic space signals which are not controlled by the sensing of blank columns NP in a card.

The testing pins 59 and 62 are supported by a vertically reciprocable carrier comprising a bar 65 reciprocable vertically in slots formed in the end frames 57 and plates 66, 67 movable with the bar 65 and the testing pins are urged downwards, as viewed in Figs. 13 and 14, by springs 68, Fig. 13. The bar 65 is supported by arms 69 pivoted on a spindle 70 mounted in the end frames 57 and to one end of the bar 65 is secured a block 71, Fig. 14, having a horizontal slot in which is located the tongue portion of a tongued plate 72 carried by a shaft 73 rockable in frame plates 74, Figs. 7A and 16, which support the testing mechanism for sensing the setup members 21.

Reciprocation of the bar 65 is effected from the rear main shaft 34 to which is secured a clutch dog 75, Fig. 16, with which co-operates a clutch pawl 76 carried by a clutch plate 77 freely mounted on the shaft 34. Secured to the clutch plate 77 for movement therewith is an eccentric 78 provided with an eccentric strap 79 the end of which is pivoted on a stud 80 carried by a lever 81 pivoted on a fixed shaft 82. The lever 81 is connected at 83 to a link 84 which is also connected to an arm 85 secured to the shaft 73. Thus when the clutch 75, 76, 77 is operative the link 84 rocks the arm 85 and shaft 73 thereby causing the bar 65 to be reciprocated vertically to effect sensing of the set-up members 21. The block 71 is slidable lengthwise of the tongued plate 72 as the carriage 57 is moved along the rack 58 and the shaft 34 is rotated at a speed such that the columns of sensing elements 55, 56 sense the columns of set-up members 21 in succession, the second column 56 sensing a column of set-up members in the sensing cycle next following the cycle during which it was sensed by the first column 55 of sensing elements. The timing is such that a testing cycle is represented by one revolution of the shaft 34.

The clutch 75, 76 is engaged during the period the carriage is under control of its escapement mechanism but as it takes four cycles of the shaft 34 to return the carriage to its starting position it is necessary to prevent operation of the tongued plate 72 during these four cycles. This is effected by an arm 570, Fig. 16, secured to a shaft 571 rotated through a normally inactive clutch 569, Fig. 7A, which is rendered active by operation of a Bowden wire 572 when the carriage reaches the end of its forward movement. The arm 570 carries a roller 573 engaging a bell-crank 574 pivoted at 575 to a frame 576 and urged by a spring 577 towards the clutch pawl 76. While shaft 571 is stationary roller 573 engages bell-crank 574 and holds it out of the path of pawl 76. On rotation of shaft 571, however, roller 573 disengages bell-crank 574 so that the latter is sprung into the path of pawl 76 and trips the pawl out of engagement with clutch dog 75 thereby interrupting operation of shaft 73 although shaft 34 continues to rotate. When the carriage is restored to the starting position thereof shaft 571 is declutched and roller 573 is again positioned to retain bell-crank 574 in the inactive position thereof.

The hatchet pins 60, 63 are supported by fixed plates 86, 87 and are located in slots formed in the plates and in which they are rockable lengthwise of a shutter 88, Figs. 13 and 16, supported by straps 89 secured to arms 90 rockable with a rocking shaft 91 mounted in the carriage end plates 57.

The manner of operation of the hatchet pins 60, 63 and shutter 88 is well understood in the art and is as described in British patent specification No. 401,012. In the machine herein described, however, the shaft 91 is rocked by a shutter operating arm 92 secured to the shaft, see Fig. 14, the arm carrying a stud 93 which at predetermined intervals is engaged by a shutter plate 94, Fig. 7A, supported by a shaft 95 rockable in the frame plates 74. The shaft 95 carries an arm 96, Fig. 17, to which is connected a link 97 operation of which is controlled by a cam, not shown, on the rear main shaft 34.

The escapement mechanism by which stepwise movement of the carriage 57 is effected comprises a known form of toothed wheel 99 and pawls 100 and 101 on a rocking shaft 102, a gear wheel, not shown, on the spindle 103 for the toothed wheel being in mesh with the rack 58. As is well understood when the pawl 101 is operated the toothed wheel 99 is caused to rotate the wheel 99 one tooth space and the pawl 100 acts as a stop. Operation of the rocking shaft 102 is effected by an escapement operating arm 104 secured thereto and connected to one end of a curved link 105 the other end of which is connected to a lever 106 pivoted to the carriage at 107 and arranged normally to be under the control of a spring 108. On downward movement of the bar 65, however, the bar depresses the lever 106 thus through link 105 and arm 104 effecting rocking of the shaft 102 and consequent operation of the escapement to effect a step movement of the carriage.

From the foregoing it will be understood that the cyclic operation of the bar 65 will tend to effect cyclic operation of the escapement but the present invention provides interrupter means to prevent such operation on testing predetermined columns of set-up members 21.

As has been explained above although the data sensed from card columns 4 and 5, 37 and 38, 39 and 40 is to be spaced apart on the tape by a space signal there are no blank columns NP to ensure the provision of the requisite space signals. In the present machine these signals are initiated by the aforesaid interrupter element consisting of testing pin 62, hatchet pin 63, and actuator 64 forming part of the first column 55 of sensing elements.

Extending between the frame plates 74 and fixed thereto is a first control means comprising a bar 109, Figs. 8 and 15, and formed therein at positions aligned respectively with columns 4, 30, 37 and 39 (for the forty column card herein referred to) of the set-up members 21 are slots of which one is indicated at 110, Fig. 15. The depth of the slot is such that the bottom thereof is disposed at the height of a set-up member 21 which has not been raised by a card disposed in sensing relation thereto. Thus as the carriage progresses along the rack 58 the testing pin 62 of the interrupter element rides along the top of the bar 109 and is thereby rendered inactive until it reaches one of the slots 110 when it descends into the slot and is rendered active. Accordingly, when the pin 62 is rendered active the upward movement of the bar 65 causes the actuator 64 of the interrupter element to be raised and to rock a latching lever 111 which is freely mounted on a spindle 112. The lever 111 is normally retained in the position shown in Fig. 14 by a spring 113 but on being rocked engages a pin 114 on one arm 115 of a shutter latch the other arm of which is shown at 116, Figs. 14 and 15, and has a latching piece 117 engageable with a nose 118 on the shutter operating arm 92. The arm 115 is secured to a spindle 119 rockable in brackets mounted on the carriage end frames 57 and the arm 116 is free on the spindle but, by reason of a spring 120 and an abutment 121 on the arm 115, is movable with the arm 115.

The impulse which operates the lever 111 is only a momentary impulse and a catch 122 is provided to retain the lever 111 in its operated position for one sensing cycle. The catch 122 is freely pivoted on the thimble 123 of a Bowden wire 124 which forms no part of the present invention and is urged towards the latch lever 111 by a spring 125, Fig. 13. A trip element formed by a latch trip bar 126, Figs. 7A, 8, 15 and 17, is arranged cyclically to trip the catch 122 so that under control of the latching lever 111 the shutter latch 115, 116 can only remain in its latching position for one sensing cycle. The trip element 126 is supported by a rocking spindle 127 to which is connected an arm 128, in turn connected to a member 129 oscillatable lengthwise by a cam 130, Fig. 15, on the main shaft 34, the cam 130 operating the trip element once in each sensing cycle thus releasing the catch 122 should it have been rendered active by actuation of the latching lever 111.

Rocking of the spindle 119 is effected when the shutter 88 is in its operated, or active, position the operating arm 92 then being in the down position thereof as shown in Fig. 14, the hatchet pins 60, 63 being held as shown in Fig. 13, in positions such that they are out of alignment with the testing pins 59, 62, so that although the testing pins may be reciprocated by the continuing action of bar 65 no setting is transmitted through the ratchet pins. When the spindle 119 is rocked it operates the shutter latch, as above described, so that the latch is positioned in the path of the shutter operating arm 92 thereby preventing arm 92 from rising. Simultaneously, an escapement latch 131, Figs. 12 and 15, secured to the spindle 119 is rocked thereby to engage with an overturned portion 132 on the escapement operating arm 104 thus preventing the raising of arm 104 by the curved arm 105 and ensuring that the escapement is not operated. Accordingly, for one sensing cycle, operation of the escapement mechanism is interrupted and the testing device is rendered ineffective under control from the interrupter means 62, 63, 64, 109, 110 and the interrupter means is rendered ineffective by the cyclically operable trip element 126. This occurs at each of the numbers 4, 30, 37 and 39 column positions as described above.

At the column 31 position, however, the record card may contain a control hole, as at data-indicating position C12, Fig. 5, indicating that the escapement and sensing device are to be rendered ineffective for twelve consecutive sensing cycles, or there may be a control hole, as indicated at position C24, Fig. 5, indicating that the escapement and sensing device are to be rendered ineffective for twenty-four consecutive sensing cycles. In such instances the interrupter means operate in the manner just described and the trip element 126 also operates so that it is necessary to provide a delay device, now to be described, to retain the arms 115, 116, and consequently the common spindle 119, in the rocked potion thereof for the required number of successive sensing cycles.

Referring to Figs. 12 to 14, a U-shaped bracket 133 is pivoted to a block 134 secured to the top of the carriage structure for movement therewith, the block housing four short rods 135 arranged side by side in a row for lengthwise movement to effect operation of four Bowden wires 136 connected one to each of the rods. Only two of the rods 135 and wires 136 are used for the purposes of the present invention, these being the two inner ones of the row, referred to below as 136—C12 and 136—C24, and the purpose and manner of operation of the other two rods and wires will not be referred to herein. To each of the rods 135 is hingedly connected an interponent 137 extending through the base of the bracket 133 so that when the bracket is swung downwards, as viewed in Figs. 12 to 14, the interponents are brought into axial alignment with the rods 135. Normally, the bracket 133 is retained in the position shown in the drawings by an abutment 138 extending laterally therefrom and riding on the top of a second control means comprising a fixed bar 139, Fig. 14, extending lengthwise of the path of the carriage. When the carriage reaches the position for testing column 31 the abutment 138, under the action of the spring 113 and on operation of the latching lever 111, drops into a depression or slot 141 formed in the bar 139 so that the bracket 133 is moved downwards and axially aligns interponents 137 with rods 135. A link 142 connects bracket 133 with latching lever 111 through slot 143 and pin 144. When the abutment 138 is positioned over the depression 141 it is held out of the depression, against the action of spring 113, by the pin 144 until the latching lever 111 is rocked downwards when, owing to the action of spring 113, it follows the lever 111 until it is located at the bottom of the depression 141. It will be understood that except when the carriage is in position to test column 31 the latching lever 111 is free to be rocked by the actuator 64 of the interrupter element because when the abutment 138 is resting on the top of the bar the link 142 is in its raised position and the pin 144 is movable freely in the slot 143.

If when the testing device is in position for the testing pins 59 of the first column of sensing elements to test column 31, the appropriate pins 59 should determine that a control hole C12 or C24 is punched in the cards, the actuator pins 61 co-operating with such testing pins will, on the upward movement of bar 65, each rock an actuating member formed as a bell-crank 145 freely mounted on the spindle 112, to effect axial movement of one or other, or both if the card has both control holes C12 and C24, of the two aforementioned inner rods 135 through engagement of the bell-cranks with the interponents 137 appropriate thereto. From the drawing it will be understood that except when the first column of sensing elements is positioned to test columns 31 the interponents 137 are raised to a position at which the bell-crank 145 if operated will pass beneath the pins and so not effect axial movement thereof. Thus, except when testing column 31 the testing elements of the first row are all permitted to perform their normal functions which form no part of the present invention and will not be described herein.

On axial movement of an interponent 137 by its actuating member 145 it rocks a delay catch 146, pivoted freely at 147, thus disengaging the catch from an abutment 148 on a delay latch 149 pivoted at 150. When released by the delay catch 146 the delay latch 149, under the action of a spring, not shown, is moved into latching engagement with the pin 114 on arm 115 and so prevents the return movement of latches 116, 117 and 131 when the trip element 126 trips the catch 122. Accordingly, the delay latch 149 will retain the escapement and shutter ineffective until the delay latch 149 is released by the operation of a trip member formed by a Bowden wire 151 as described below.

The number of sensing cycles during which the delay latch 149 remains effective is determined by a space unit, Figs. 7B, 18, 19 and 20.

The space unit comprises a base plate 152 supported by short pillars 153 mounted on the bed of the machine and the base plate supports two side plates 154, 155. Also mounted on the base plate 152 are two bearing blocks 156, 157 in which a driving shaft 158 is rotatable being driven from the main shaft 34 through gearing 159, 160, 161 so that it is continuously rotated.

A worm wheel 162 secured to shaft 158 drives a second worm wheel 163 freely mounted on a shaft 164 which is a fixed shaft mounted in the side plates 154, 155. The worm wheel 163 forms part of a timing device assembly which includes two drums 165, 166 and ratchet wheels 167, 168 the assembly being continuously rotated as a whole by the worm wheels 162, 163.

A first timing disc 169 and a second timing disc 170 are freely mounted on shaft 164 to be co-axial therewith and carry clutch pawls 171, 172 pivoted respectively at 173, 174. The clutch pawls are urged towards the ratchet wheels by springs as indicated at 175, Fig. 19, and are normally held out of engagement with the ratchet wheels by clutch release members 176, 177 which are freely pivoted on studs 178, 179 secured to the side plates 154, 155 and urged towards the pawls 171, 172 by springs 180, 181, Fig. 18.

Brackets 182, 183 are fixed to the side plates 154, 155 and bell-cranks 184, 185 are pivoted at 186, 187 respectively to the brackets. One arm of each bell-crank is controlled by a Bowden wire, the bell-crank 184 being controlled by the wire 136—C12 and bell-crank 185 being controlled by the wire 136—C24, and the other arms of the bell-cranks respectively engage studs 188, 189 secured to the clutch release member 176, 177. Actuation of Bowden wire 136—C12 or 136—C24 by its bell-crank 145, Figs. 12 to 14, will cause member 176 or 177 respectively to be disengaged from its clutch pawl 171 or 172 so that the pawl engages its ratchet wheel 167 or 168 thereby causing the timing disc on which the pawl is carried to rotate with the timing device assembly. The clutch formed by the said assembly, timing discs, and clutch release members is a one revolution clutch as the impulse imparted by a Bowden wire 136—C12 or 136—C24 is of short duration thus ensuring that the clutch release member is returned into the path of the released pawl before the latter has completed one revolution with its timing disc.

The ratio of the worm wheels 162, 163 is 30:1 so that one revolution of a timing disc 169 or 170 is the equivalent of thirty sensing cycles and of thirty punching cycles. In the embodiment herein described, however, it is desired by the operation of the spacing unit selectively to obtain punching of either twelve or twenty-four successive space signals. To this end the timing discs 169, 170 respectively carry abutments 190, 191 to cooperate respectively with a first trip arm 192 and a second trip arm 193 both trip arms being secured to a spindle 194. Also secured to the spindle 194 is a trip lever 195 which, when the spindle is rocked, actuates the Bowden wire 151 thereby tripping the shutter delay latch 149, Fig. 14, and so permitting the escapement mechanism and shutter 88 again to become operative.

Operation of trip lever 195 by the first trip arm 192 is effected by an operating arm 196 slidable axially on spindle 194, an abutment 197 extending laterally from the trip arm 192 for abutment by operating arm 196. A spring 198, Fig. 20, maintains abutting relation between operating arm 196 and abutment 197. The abutment 190 is so disposed on the timing disc 169 in relation to the arrested position of pawl 171 that when only wire 136—C12 is operated the abutment will operate trip lever 195, and thereby the wire 151, after an interval equal to twelve sensing and punching cycles.

If on the other hand only the wire 136—C24 should be operated the abutment 191 on timing disc 170 is so disposed in relation to the arrested position of pawl 172 that it will operate trip lever 195, and thereby the wire 151, after an interval equal to twenty-four sensing and punching cycles.

There will be some occasions when the wire 136—C12 and 136—C24 are operated simultaneously and it is then desired that only the second trip arm 193 is effective. Accordingly at such times means must be provided to disable the first trip arm 192. The disabling means comprises detent arms 199, 200 which respectively co-operate with V-notches in the peripheries of the timing discs 169, 170, being urged towards the timing discs by springs 201, 202, Figs. 19 and 20. The detent arm 200 for timing disc 170 is abutted by a stud 203 depending from a bell-crank 204 pivoted at 205 to the top of the side plate 155. Connected to the bell-crank 204 at 206 is a disabling link 207, the link 207 being also connected at 208 to a collar 209 slidable axially along the spindle 194. At its free end the link 207 carries a pin 210 which is engaged in a circumferential groove 211 formed in the boss 212 of operating arm 196.

On simultaneous operation of wires 136—C12 and 136—C24 the timing discs 169 and 170 are caused simultaneously to rotate and this moves the detent arms 199, 200 about their pivots outwards from the discs. The outward movement of detent arm 200 rocks the bell-crank 204, to the position shown in Fig. 21, thereby causing the disabling link 207 to be moved lengthwise in direction of arrow 213, Figs. 18 and 20. The lengthwise movement of link 207 causes the operating arm 196 to be moved in the same direction to a position at which it cannot be engaged but the abutment 190 on timing disc 169. Accordingly trip arm 192 is not operated to effect rocking of spindle 194 and so the spindle is not rocked until abutment 191 on timing disc 170 engages the trip arm 193. The bell-crank 204 and link 207 are restored by a spring not shown.

In the foregoing description the space unit has been described as one which is selectively operable to control interruption of operation of the escapement mechanism and shutter so as to obtain either twelve or twenty-four space signals in the tape. It will, however, be understood that by altering the positions of the abutments 190, 191 there may, with the construction described in which the ratio of the worm wheels 162, 163 is 30:1 be obtained any desired predetermined number of spaces between one and thirty. Further, the range may be increased or decreased by the use of worm wheels giving a ratio different from that herein described.

It will also be understood that, if desired, the space unit may be modified so as, on operation thereof, to provide only one predetermined number of space signals by the omission of one of the timing devices provided in the space unit or by the provision of means to disable one of the timing devices.

We claim:

1. A machine comprising the combination with set-up members controlled by a record card and arranged in columns corresponding to the columns of the record card to receive a set-up representative of data sensed from the card, a testing device including testing pins arranged to test said set-up members column by column, escapement mechanism to effect the column by column movement of the testing device, translator means operable under control of the testing pins to receive from the set-up members data sensed from a card and to translate it into coded form, recording means operable under control of the translator means to record the coded data on a tape, continuously operable tape-feeding means to feed the tape stepwise one step for each testing cycle of the machine, and space signal means operable under control of the translator means to record a space signal on the tape, of an interrupter pin movable with said testing pins, a stationary control bar extending lengthwise of the path of the testing device and co-operating with said interrupter pin normally to retain it in the ineffective condition thereof, control means on said bar and aligned with predetermined testing positions of the testing device to render the interrupter pin effective, means actuated by the interrupter pin in the effective condition thereof and co-operating with said escapement mechanism to render said mechanism ineffective for one sensing cycle during which said space signal means is effective to control the recording of a space signal on the tape, and cyclically operable trip means co-operating with said interrupter pin to restore the pin to the ineffective condition thereof.

2. Apparatus according to claim 1, including a delay device co-operating with said interrupter pin and operable under control of a control hole formed in a card being tested by the testing device to render said interrupter pin, irrespective of the action of said trip means, ineffective for a predetermined number of sensing cycles during each of which said space signal means is effective to control the recording of a space signal on the tape.

3. A machine comprising set-up members controlled by a statistical record card and arranged in columns corresponding to the columns of the record card to receive a set-up representative of data sensed from the card, testing elements arranged columnwise to test the set-up of columns of set-up members, a carriage supporting the testing elements for stepwise movement over the set-up members, operating means to move testing elements relative to the set-up members to effect testing thereof, a shutter to restore the testing elements to the inactive positions thereof after a testing operation, escapement mechanism operable by said operating means to effect stepwise movement of the carriage, translator means operable under control of the testing elements to receive from the set-up members data sensed from a card and to translate it into coded form, a tape-punching unit operable under control of the translator means to punch in a tape a record of the coded data, continuously operable tape-feeding means to feed the tape stepwise one step for for each testing cycle of the machine, space signal means operable under control of the translator means to condition the tape-punching unit to record a space signal on the tape, latch mechanism to effect latching of said shutter and escapement mechanism, latch mechanism operating elements movable with said first column of testing elements, a stationary bar extending lengthwise of the path of the carriage and having means aligned with predetermined columns of set-up members to render effective the latch mechanism operating elements thereby to effect latching of the shutter and escapement mechanism for one sensing cycle during which said space signal means is effective to control the recording of a space signal on the tape, a cyclically operable trip element to render said latch mechanism operating elements ineffective, and a delay device operable under control of a control hole formed in a record being tested by the testing device to render said latch mechanism operating elements, irrespective of the action of the trip element, ineffective for a predetermined number of sensing cycles during each of which said space signal means is effective to control the recording of a space signal on the tape.

4. A machine according to claim 3, wherein the latch mechanism includes a rocking spindle, an escapement latch and a shutter latch mounted on said rocking spindle for movement therewith, a latching lever to co-operate with the shutter latch and operable by said latch mechanism operating elements, and a catch trippable by said trip element and spring-urged towards the latching lever to retain the latching lever in active engagement with the shutter latch.

5. A machine according to claim 4, wherein the delay device includes a delay latch to retain said rocking spindle in the latched condition thereof after tripping of the latching lever, a delay catch operable to retain the delay latch in a normally inactive position, an actuating member operable by a predetermined one of the testing elements of said first column of testing elements, a normally inactive interponent movable to and from a position at which it is engageable by the actuating member to effect tripping of the delay catch to release the delay latch and permit movement thereof into latching relation with the shutter latch, and wherein a second control means is aligned with a predetermined column of set-up members to permit movement of the interponent to the active position thereof for actuation by said actuating member, and a trip member is operable after a predetermined number of successive ineffective testing cycles to co-operate with and render the interrupter means ineffective.

6. A machine according to claim 5, including a space unit to control operation of said trip member, said space unit comprising a continuously rotatable driving shaft, a timing device continuously rotated by the driving shaft, reduction gearing coupling said driving shaft and timing device, a timing disc co-axial with the timing device, a normally inactive clutch to couple the timing disc to the timing device for rotation therewith, a clutch release member operable by said interponent to couple the disc to the timing device, a trip lever to actuate said trip member, a trip arm connected with the trip lever to effect actuation thereof, and an abutment carried by said disc to engage the trip arm and effect actuation of the trip lever after a predetermined number of revolutions of said driving shaft counted from the clutching of the timing disc to the timing device.

7. A machine according to claim 4, including a space unit to control operation of said trip member, said space unit comprising a continuously rotatable driving shaft, a timing device continuously rotated by the driving shaft, reduction gearing coupling said driving shaft and timing device, a first timing disc co-axial with the timing device, a second timing disc co-axial with the timing device and spaced axially from said first timing disc, a normally inactive clutch device for each said timing disc to couple the disc with which it co-operates to the timing device, a trip lever to actuate said trip member, a first trip arm operable by said first timing disc and connected with said trip lever to effect actuation thereof, a second trip arm operable by said second timing disc and connected with said trip lever to effect actuation thereof, a first abutment carried by the first timing disc to effect operation of the first trip arm after one predetermined number of revolutions of the driving shaft counted from the clutching of the first timing disc to the timing device, and a second abutment carried by the second timing disc to effect operation of the second trip arm after another predetermined number of revolutions of the driving shaft counted from the clutching of the second timing disc to the timing device.

8. A machine according to claim 7, wherein said first trip arm is supported for movement into and out of the path of said first abutment, and disabling means co-operates with the first trip arm to move it out of the path of said first abutment on simultaneous rotation of said first and second timing discs thereby to render said first trip arm ineffective so that the trip lever is operated only by said second trip arm.

9. A machine according to claim 8, wherein the disabling means comprises a bell-crank rockable by said second timing disc, an operating arm to effect actuation of the first trip arm, and a disabling link connecting said bell-crank and operating arm whereby rocking of the bell-crank effects movement of the operating arm in a direction parallel to the axis of the timing device to a position at which the operating arm is out of the path of said first abutment.

10. A machine comprising the combination with set-up members controlled by a record card and arranged in columns corresponding to the columns of the record card to receive a set-up representative of data sensed from the card, a testing device arranged to test said set-up members column by column, translator means operable under control of the testing elements to receive from the set-up members data sensed from a card and to translate it into coded form, a tape-punching unit operable under control of the translator means to punch in a tape a record of the coded data, continuously operable tape-feeding means to feed the tape stepwise one step for each testing cycle of the machine, and space signal means operable under control of the translator means to condition the tape-punching unit to record a space signal on the tape, of interrupter means including normally inactive latch mechanism operative when active to render the testing device ineffective for at least one testing cycle during which a space signal is recorded on the tape, and an interrupter element to render said latch mechanism active, control means co-operating with said interrupter means and arranged on testing for data from predetermined columns of set-up members to initiate operation of the interrupter means, a normally inactive delay latch mechanism operative when active to retain said latch mechanism in the active condition thereof, an actuating member operable by a predetermined one of the testing elements, a normally inactive interponent for operation by said actuating member to initiate operation of said delay latch mechanism, a second control means aligned with a predetermined column of set-up members to permit movement of the interponent to the active position thereof for actuation by said actuating member, a trip member operable after a predetermined number of successive ineffective testing cycles to co-operate with and render the interrupter means ineffective, a space unit to control operation of said trip member, said space unit comprising a continuously rotatable driving shaft, a timing device continuously rotated by the driving shaft, reduction gearing coupling said driving shaft and timing device, a timing disc co-axial with the timing device, a normally inactive clutch to couple the timing disc to the timing device for rotation therewith, a clutch release member operable by said interponent to couple the disc to the timing device, a trip lever to actuate said trip member, a trip arm connected with the trip lever to effect actuation thereof, and an abutment carried by said disc to engage the trip arm and effect actuation of the trip lever after a predetermined number of revolutions of said driving shaft counted from the clutching of the timing disc to the timing device.

11. A machine comprising the combination with set-up members controlled by a record card and arranged in columns corresponding to the columns of the record card to receive a set-up representative of data sensed from the card, a testing device arranged to test said set-up members column by column, translator means operable under control of the testing elements to receive from the set-up members data sensed from a card and to translate it into coded form, a tape-punching unit operable under control of the translator means to punch in a tape a record of the coded data, continuously operable tape-feeding means to feed the tape stepwise one step for each testing cycle of the machine, and space signal means operable under control of the translator means to condition the tape-punching unit to record a space signal on the tape, of interrupter means including normally inactive latch mechanism operative when active to render the testing device ineffective for at least one testing cycle during which a space signal is recorded on the tape, and an interrupter element to render said latch mechanism active, control means co-operating with said interrupter means and arranged on testing for data from predetermined columns of set-up members to initiate operation of the interrupter means, a normally inactive delay latch mechanism operative when active to retain said latch mechanism in the active condition thereof, an actuating member operable by a predetermined one of the testing elements, a normally inactive interponent for operation by said actuating member to initiate operation of said delay latch mechanism, a second control means aligned with a predetermined column of set-up members to permit movement of the interponent to the active position thereof for actuation by said actuating member, a trip member operable after a predetermined number of successive ineffective testing cycles to co-operate with and render the interrupter means ineffective, a space unit to control operation of said trip member, said space unit comprising a continuously rotatable driving shaft, a timing device continuously rotated by the driving shaft, reduction gearing coupling said driving shaft and timing device, a first timing disc co-axial with the timing device, a second timing disc co-axial with the timing device and spaced axially from said first timing disc, a normally inactive clutch device for each said timing disc to couple the disc with which it co-operates to the timing device, a trip lever to actuate said trip member, a first trip arm operable by said first timing disc and connected with said trip lever to effect actuation thereof, a second trip arm operable by said second timing disc and connected with said trip lever to effect actuation thereof, a first abutment carried by the first timing disc to effect operation of the first trip arm after one predetermined number of revolutions of the driving shaft counted from the clutching of the first timing disc to the timing device, and a second abutment carried by the second timing disc to effect operation of the second trip arm after another predetermined number of revolutions of the driving shaft counted from the clutching of the second timing disc to the timing device.

12. A machine according to claim 11, wherein said first trip arm is supported for movement into and out of the path of said first abutment, and disabling means co-operates with the first trip arm to move it out of the path of said first abutment on simultaneous rotation of said first and second timing discs thereby to render said first trip arm ineffective so that the trip lever is operated only by said second trip arm.

13. A machine according to claim 12, wherein the disabling means comprises a bell-crank rockable by said second timing disc, an operating arm to effect actuation of the first trip arm, and a disabling link connecting said bell-crank and operating arm whereby rocking of the bell-crank effects movement of the operating arm in a direction parallel to the axis of the timing device to a position at which the operating arm is out of the path of said first abutment.

References Cited in the file of this patent

UNITED STATES PATENTS

| | | |
|---|---|---|
| 1,839,402 | Lorant | Jan. 5, 1932 |
| 1,962,750 | Read | June 12, 1934 |
| 2,340,800 | Doty | Feb. 1, 1944 |
| 2,357,460 | Doty | Sept. 5, 1944 |
| 2,377,766 | Doty | June 5, 1945 |
| 2,540,029 | Hamilton et al. | Jan. 30, 1951 |
| 2,620,878 | Rabenda | Dec. 9, 1952 |